(12) United States Patent
Otawara et al.

(10) Patent No.: US 11,183,904 B2
(45) Date of Patent: Nov. 23, 2021

(54) MOTOR

(71) Applicant: DENSO CORPORATION, Kariya (JP)

(72) Inventors: Akihiro Otawara, Toyohashi (JP);
Tomoaki Ozaki, Toyohashi (JP);
Suguru Yamabe, Hamamatsu (JP);
Kazuyoshi Takahashi, Hamamatsu (JP)

(73) Assignee: DENSO CORPORATION, Kariya (JP)

( * ) Notice: Subject to any disclaimer, the term of this patent is extended or adjusted under 35 U.S.C. 154(b) by 174 days.

(21) Appl. No.: 16/336,875

(22) PCT Filed: Oct. 31, 2017

(86) PCT No.: PCT/JP2017/039333
§ 371 (c)(1),
(2) Date: Mar. 26, 2019

(87) PCT Pub. No.: WO2018/084144
PCT Pub. Date: May 11, 2018

(65) Prior Publication Data
US 2019/0252952 A1 Aug. 15, 2019

(30) Foreign Application Priority Data

Nov. 7, 2016 (JP) .............................. JP2016-217251
Oct. 25, 2017 (JP) .............................. JP2017-206310

(51) Int. Cl.
*H02K 11/30* (2016.01)
*H02K 11/215* (2016.01)
(Continued)

(52) U.S. Cl.
CPC .............. *H02K 11/30* (2016.01); *H02K 5/22* (2013.01); *H02K 7/116* (2013.01); *H02K 11/215* (2016.01); *H02K 11/38* (2016.01); *H02K 2203/03* (2013.01)

(58) Field of Classification Search
CPC ........ H02K 7/1166; H02K 11/38; H02K 5/22; H02K 7/116; H02K 11/30; H02K 11/215; H02K 2203/03
See application file for complete search history.

(56) References Cited

U.S. PATENT DOCUMENTS 3,529,227 A * 9/1970 Kearns .................... B60S 1/482
318/443
2012/0139371 A1 6/2012 Gottschalk et al.
(Continued)

FOREIGN PATENT DOCUMENTS

CN 101920721 A 12/2010
CN 203219652 U 9/2013
(Continued)

OTHER PUBLICATIONS

Tani, Machine Translation of JP2016115538, Jun. 2016 (Year: 2016).*
(Continued)

*Primary Examiner* — Quyen P Leung
*Assistant Examiner* — Eric Johnson
(74) *Attorney, Agent, or Firm* — Oliff PLC

(57) ABSTRACT

A motor includes a motor body, a speed reduction unit, a brush holder, and a circuit board. The motor body rotationally drives a rotation shaft. The speed reduction unit reduces speed of rotation of the rotation shaft. The brush holder is held by a motor case of the motor body and a gear housing of the speed reduction unit. The circuit board is arranged in a board receptacle that is open in a direction orthogonal to a motor flattened surface. The brush holder includes a terminal that is directly and electrically connected to the circuit board.

20 Claims, 7 Drawing Sheets

(51) Int. Cl.
*H02K 7/116* (2006.01)
*H02K 11/38* (2016.01)
*H02K 5/22* (2006.01)

(56) References Cited

U.S. PATENT DOCUMENTS

| | | | |
|---|---|---|---|
| 2012/0295490 A1* | 11/2012 | Schneider | H01R 12/91 439/709 |
| 2013/0234567 A1* | 9/2013 | Weber | B29C 66/12821 310/68 D |
| 2013/0242484 A1 | 9/2013 | Schweichart et al. | |
| 2013/0285492 A1 | 10/2013 | Ozaki et al. | |
| 2015/0326096 A1* | 11/2015 | Takamura | H02K 11/0141 310/68 D |
| 2016/0262266 A1 | 9/2016 | Matsumoto et al. | |
| 2019/0044406 A1* | 2/2019 | Yamamoto | H02K 7/083 |

FOREIGN PATENT DOCUMENTS

| | | |
|---|---|---|
| CN | 104488175 A | 4/2015 |
| CN | 105122607 A | 12/2015 |
| DE | 10 2013 207 578 A1 | 10/2014 |
| JP | 2006-211869 A | 8/2006 |
| JP | 2010-288328 A | 12/2010 |
| JP | 2013-243903 A | 12/2013 |
| JP | 2016-115538 A | 6/2016 |
| JP | 2016-162738 A | 9/2016 |
| WO | 2014/016093 A2 | 1/2014 |

OTHER PUBLICATIONS

Anding, Machine Translation of WO2014016093, Jan. 2014 (Year: 2014).*

Anding, Machine Translastion of DE102013207578, Oct. 2014 (Year: 2014).*

* cited by examiner

MOTOR

TECHNICAL FIELD

The present invention relates to a motor.

BACKGROUND ART

A typical motor includes a motor body that rotationally drives a rotation shaft, a speed reduction unit that reduces speed of rotation of the rotation shaft, a brush holder held by a motor case of the motor body and a gear housing of the speed reduction unit, and a circuit board arranged in a board receptacle of the gear housing that is open in a direction orthogonal to a flattened surface of the motor (for example, refer to patent document 1). In the motor, the brush holder includes a terminal electrically connected to a brush, and the gear housing holds a conductive member electrically connecting the terminal to the circuit board.

PRIOR ART DOCUMENT

Patent Document

Patent Document 1: International Patent Publication No. (WO)2014/016093

SUMMARY OF THE INVENTION

Problems that are to be Solved by the Invention

In a motor such as that described above, the number of components is increased due to a conductive member that electrically connects a terminal of a brush holder and a circuit board.

It is an object of the present invention to provide a motor that reduces the number of components.

Means for Solving the Problem

To achieve the above object, a motor includes a motor body, a speed reduction unit, a brush holder, and a circuit board. The motor body rotationally drives a rotation shaft. The speed reduction unit reduces speed of rotation of the rotation shaft. The brush holder is held by a motor case of the motor body and a gear housing of the speed reduction unit. The gear housing includes a board receptacle that is open in a direction orthogonal to a motor flattened surface. The circuit board is arranged in the board receptacle. The brush holder includes a terminal that is directly and electrically connected to the circuit board.

EMBODIMENTS OF THE INVENTION

An embodiment of a motor will now be described with reference to FIGS. 1 to 10.

Figure 1:
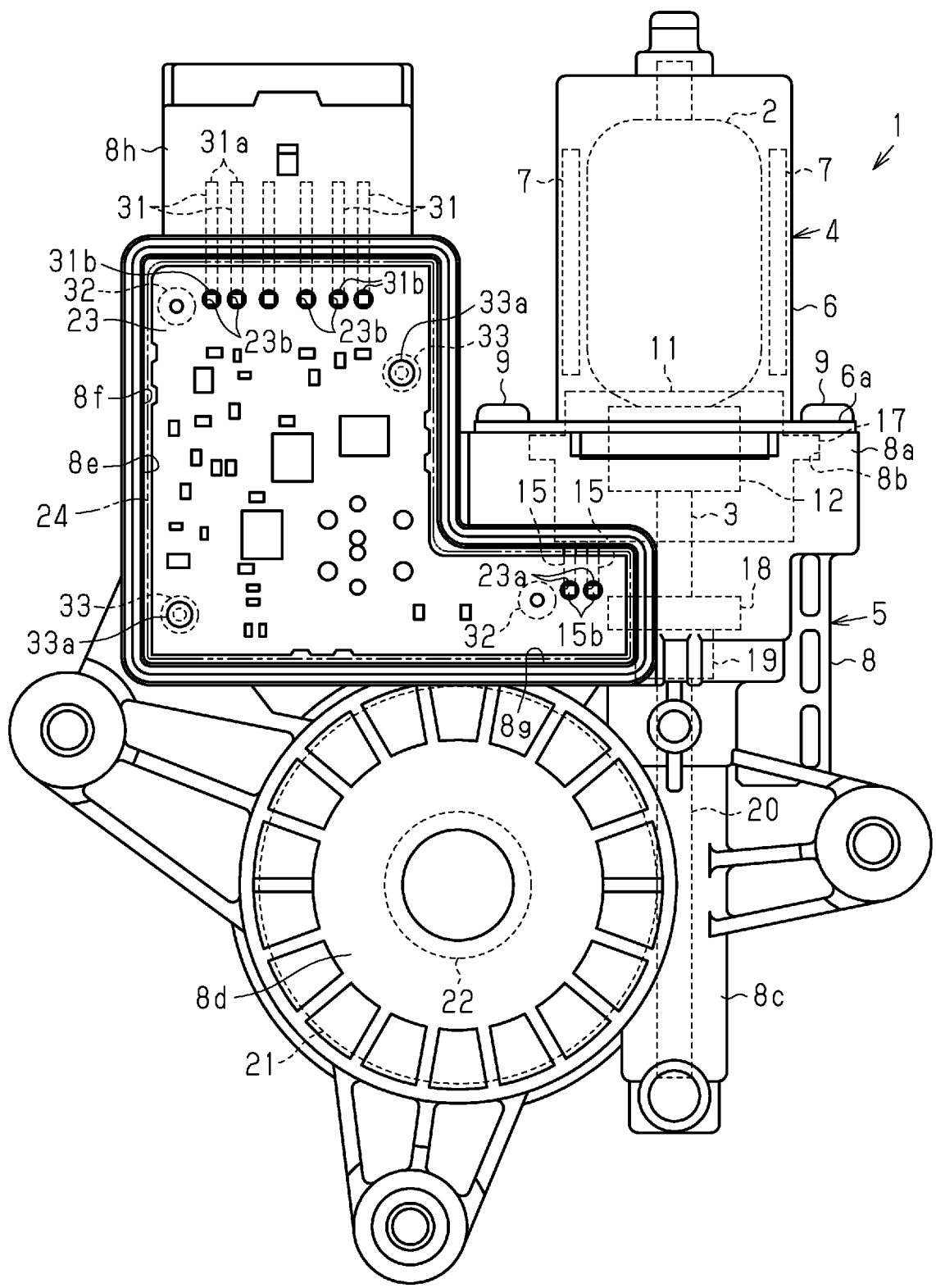
FIG. 1 is a plan view of an embodiment of a motor.

As shown in FIG. 1, the present embodiment of a motor 1 is a geared motor including a control circuit and is used as a driving source of a power window device that electrically lifts and lowers a vehicle window glass. The motor 1 includes a motor body 4 that rotationally drives a rotation shaft 3 of a rotor 2 and a speed reduction unit 5 that reduces speed of rotation of the rotation shaft 3.

A yoke housing 6, that is, a motor case of the motor body 4, is formed from a conductive metal material and is tubular and has an end wall. Permanent magnets 7 are fixed to the inner circumferential surface of the yoke housing 6. The yoke housing 6 includes a flange 6a at an opening of the yoke housing 6. The flange 6a is fastened to a fastening portion 8a of a gear housing 8 of the speed reduction unit 5 by bolts 9. As indicated by the double-dashed line in FIG. 2, the motor body 4 is flattened in a cross section that is orthogonal to the axial direction of the rotation shaft 3. More specifically, the motor body 4 extends in the axial direction (vertical direction in FIG. 1), a flattened direction (sideward direction in FIG. 2), and a direction orthogonal to the flattened direction (vertical direction in FIG. 3).

The motor 1 further includes a brush holder 11 held by the yoke housing 6 and the gear housing 8.

Figure 2:
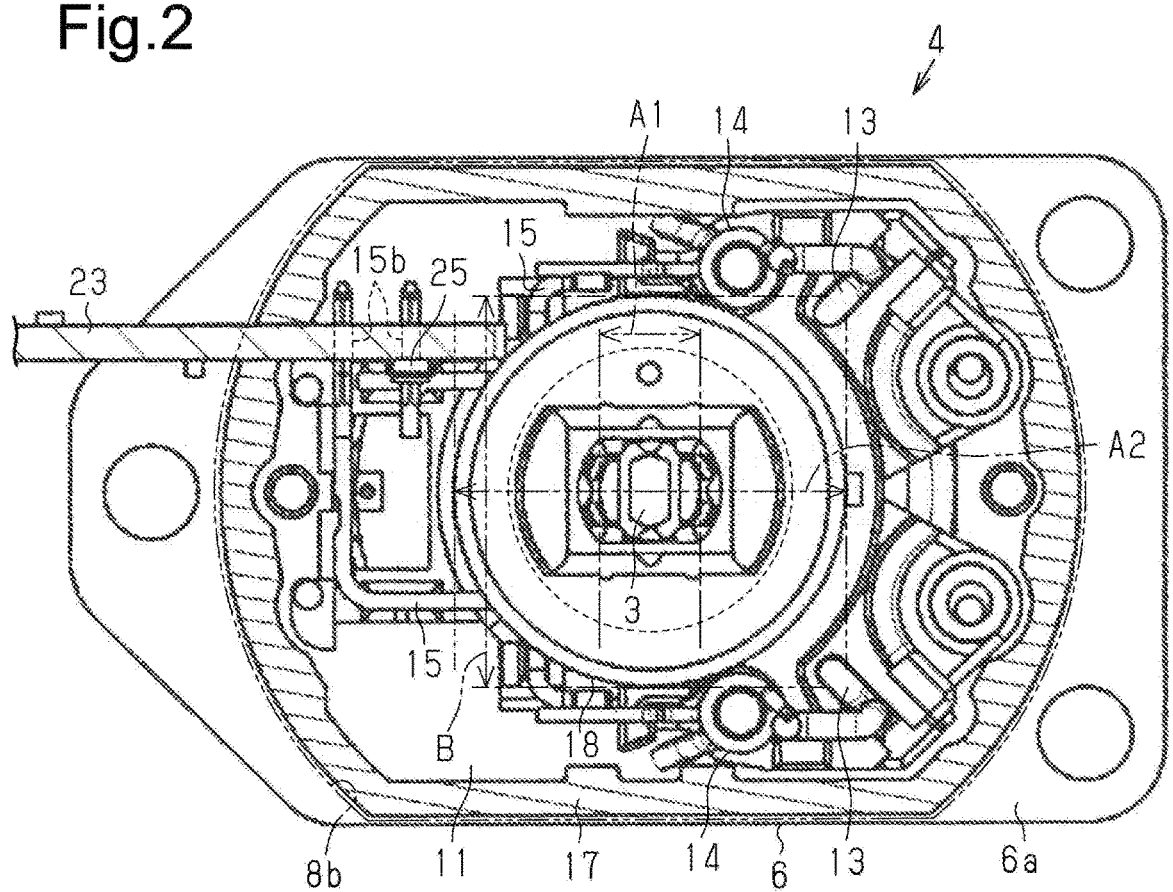
FIG. 2 is an illustrative view of a motor body and a circuit board of the embodiment taken in an axial direction.

As shown in FIG. 2, the brush holder 11 holds two brushes 13, on which a commutator 12 (refer to FIG. 1) of the rotor 2 slides. Each of the brushes 13 is electrically connected to a terminal 15 via a choke coil 14, and the terminals 15 are fixed to the brush holder 11. A portion of the brush holder 11 is fitted to an end of the yoke housing 6 close to the opening and is unitized with the motor body 4. An elastomer 17 is arranged on the brush holder 11 around a portion exposed out of the yoke housing 6. Additionally, an annular sensor magnet 18 is fixed to a distal portion of the rotation shaft 3 projecting out of the brush holder 11.

As shown in FIG. 1, the gear housing 8 is formed from a synthetic resin material and includes a brush holder receptacle 8b arranged at an inner side of the fastening portion 8a, which is fastened to the yoke housing 6. The brush holder receptacle 8b accommodates a portion (portion exposed out of the yoke housing 6) of the brush holder 11. The gear housing 8 further includes a worm receptacle 8c extending from the fastening portion 8a in the axial direction of the rotation shaft 3 and a wheel receptacle 8d located at a side (left side in FIG. 1) of the worm receptacle 8c. The worm receptacle 8c accommodates a worm shaft 20 coupled to the distal portion of the rotation shaft 3 via a clutch 19. The wheel receptacle 8d accommodates a worm wheel 21 engaged with the worm shaft 20. An output shaft 22 extends in the axial center of the worm wheel 21. The output shaft 22 is configured to be coupled to a window glass via, for example, a regulator, which is not shown in the drawings.

The gear housing 8 includes a board receptacle 8e that is open in a direction orthogonal to a motor flattened surface. The direction orthogonal to the motor flattened surface conforms to the axial direction of the worm wheel 21 (output shaft 22), a direction in which the motor 1 is flattened, and a direction orthogonal to the plane of FIG. 1. The board receptacle 8e projects from the wheel receptacle 8d toward the motor body 4 (upward in FIG. 1). The board receptacle 8e includes a large receptacle 8f having the form of a large tetragon as viewed in the direction orthogonal to the motor flattened surface and an extension receptacle 8g extending from the large receptacle 8f toward the rotation shaft 3 (sensor magnet 18) in the vicinity of the wheel receptacle 8d. The board receptacle 8e accommodates a circuit board 23 shaped in conformance with the shape of the board receptacle 8e. The board receptacle 8e has an opening that is closed with a plate-shaped cover 24.

The circuit board 23 includes a Hall IC 25 (refer to FIG. 2) serving as a magnetic sensor that detects the magnetic field of the sensor magnet 18 and an anti-entrapment controller including various elements performing anti-entrapment control on the window glass. The circuit board 23 is electrically connected to connector terminals 31 arranged on a connector 8h of the gear housing 8, which will be described later. The circuit board 23 is also electrically connected to the two terminals 15 arranged on the brush holder 11. An external connector, which is not shown in the drawings, is fitted to the tubular connector 8h. The external connector includes external terminals electrically connected to an external power supply. When the external connector is fitted to the connector 8h, the external terminals are electrically connected to the connector terminals 31, and, ultimately, the external power supply is electrically connected to the circuit board 23.

In the present embodiment, the terminals 15 of the brush holder 11 are directly and electrically connected to the circuit board 23. In the present embodiment, the connector terminals 31 of the connector 8h are directly and electrically connected to the circuit board 23.

More specifically, the circuit board 23 of the present embodiment includes through holes 23a (refer to FIGS. 6A and 6B) at positions corresponding to the terminals 15.

Figure 3A:
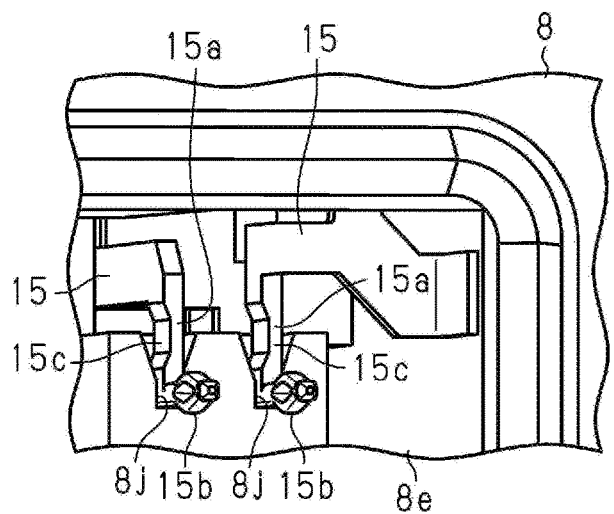
FIGS. 3A and 3B are perspective views showing the relationship between a gear housing and a terminal of the embodiment.
Figure 3B:
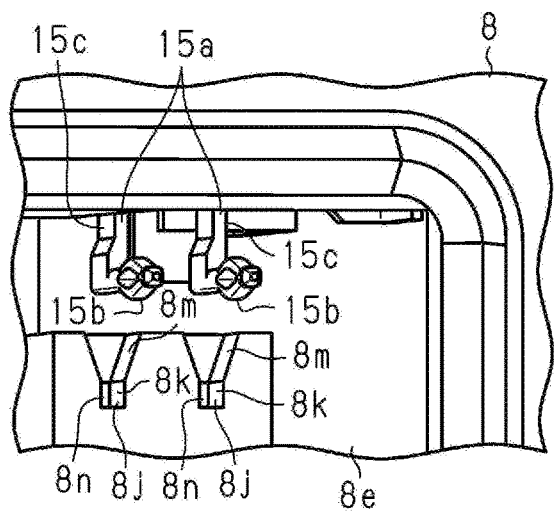

As shown in FIGS. 3A and 3B, the distal side of each terminal 15 includes an axial extension 15a that extends from the brush holder 11 in the axial direction of the rotation shaft 3 and a press-fitted portion 15b that is bent from the distal end of the axial extension 15a and extends in the direction orthogonal to the motor flattened surface (direction in which the board receptacle 8e is open, that is, direction extending frontward from the plane of FIG. 1).

Figure 6A:
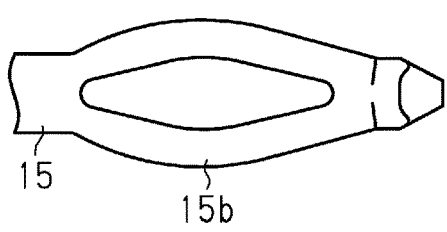
FIGS. 6A and 6B are illustrative views showing the relationship between a through hole and a press-fitted portion.
Figure 6A:
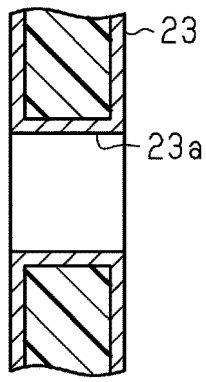
Figure 6B:
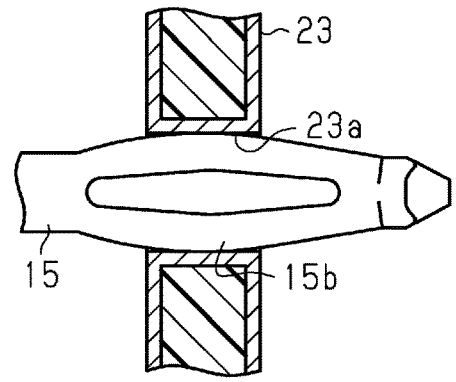

As shown in FIGS. 6A and 6B, when press-fitted into the through hole 23a, the press-fitted portion 15b is in press contact with a conductor arranged on the wall surface of the through hole 23a and electrically connected to the conductor.

As shown in FIGS. 3A and 3B, in the terminal 15 of the present embodiment, the axial extension 15a includes an intermediate portion that is slim as viewed in the direction orthogonal to the flattened direction defining a slim portion 15c.

Figure 4:
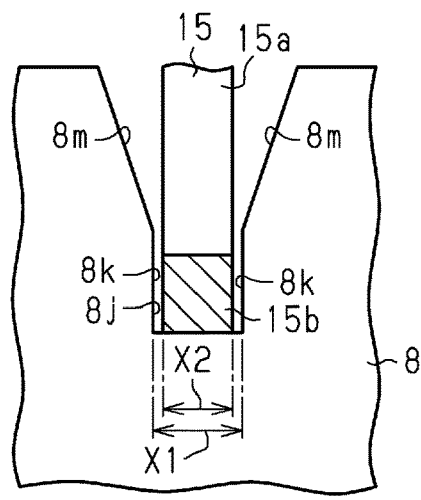
FIG. 4 is a plan view of a groove and a terminal of the embodiment.
Figure 5:
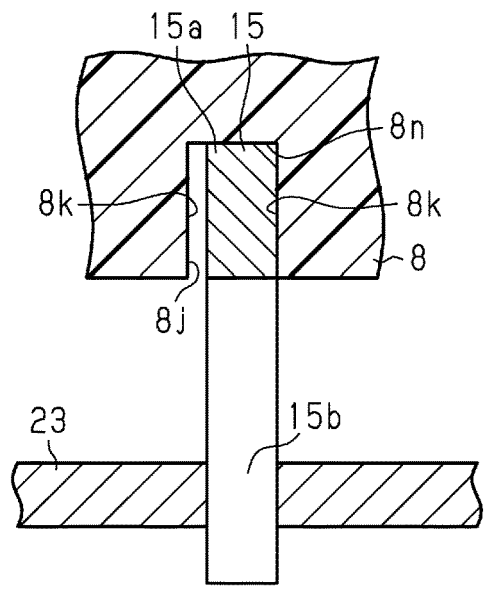
FIG. 5 is a partially cross-sectional view of the groove and the terminal of the embodiment taken in the axial direction.

As shown in FIGS. 3A, 3B, 4, and 5, the gear housing 8 includes grooves 8j extending in the bottom of the board receptacle 8e (the extension receptacle 8g). The distal side of the axial extension 15a of each terminal 15, that is, the basal end of the press-fitted portion 15b, is fitted into the groove 8j. As shown in FIG. 4, the groove 8j includes two wall surfaces 8k serving as a first restriction portion that restricts movement of the terminal 15 in a direction (sideward direction in FIG. 4) orthogonal to the axis of the rotation shaft 3 as viewed in the direction orthogonal to the motor flattened surface. In the present embodiment, a distance X1 between the two wall surfaces 8k is set to be greater than a dimension X2 of the terminal 15 (located between the wall surfaces 8k) in the direction of the distance X1. The two wall surfaces 8k include guide surfaces 8m at a location (upper side in FIG. 4) where the terminal 15 is inserted. The distance between the guide surfaces 8m is gradually increased. As shown in FIG. 5, the groove 8j also includes a seat surface 8n serving as a second restriction portion that restricts movement of the terminal 15 (press-fitted portion 15b) in a direction (upward in FIG. 5) toward the bottom of the board receptacle 8e.

As shown in FIG. 2, in the present embodiment, as viewed in the axial direction of the rotation shaft 3, the Hall IC 25 is arranged outside a range A1 of the rotation shaft 3 in a direction in which the motor flattened surface extends and a range A2 of the sensor magnet 18 in the direction in which the motor flattened surface extends. In the present embodiment, the Hall IC 25 is arranged in a range B of the sensor magnet 18 in the direction orthogonal to the motor flattened surface as viewed in the axial direction of the rotation shaft 3. More specifically, as viewed in the axial direction of the rotation shaft 3, the Hall IC 25 is arranged at a position (upper left of the rotation shaft 3 in FIG. 2) of an angle between the direction (vertical direction in FIG. 2) of the rotation shaft 3 orthogonal to the motor flattened surface and the direction (sideward direction in FIG. 2) of the rotation shaft 3 in which the motor flattened surface extends. The terminals 15 (press-fitted portions 15b) are arranged in a range of the brush holder receptacle 8b of the gear housing 8 as viewed in the axial direction of the rotation shaft 3.

When the yoke housing 6 is fastened to the gear housing 8, the brush holder 11, which is unitized with the motor body 4, is inserted into the brush holder receptacle 8b of the gear housing 8, and the terminals 15 (distal sides of the axial extensions 15a, that is, basal ends of the press-fitted portions 15b) are guided by the guide surfaces 8m and fitted into the grooves 8j. FIGS. 3B and 3A show that the terminals 15 (distal sides of the axial extensions 15a, that is, basal ends of the press-fitted portions 15b) are fitted into the grooves 8j.

When the board receptacle 8e accommodates the circuit board 23 (in direction orthogonal to flattened direction), the press-fitted portions 15b are press-fitted into the through holes 23a. As a result, the terminals 15 of the brush holder 11 are directly and electrically connected to the circuit board 23.

As shown in FIG. 1, the circuit board 23 of the present embodiment includes through holes 23b (having the same configuration as the through holes 23a shown in FIGS. 6A and 6B with cross-sectional view omitted) at positions corresponding to the connector terminals 31.

Figure 7:
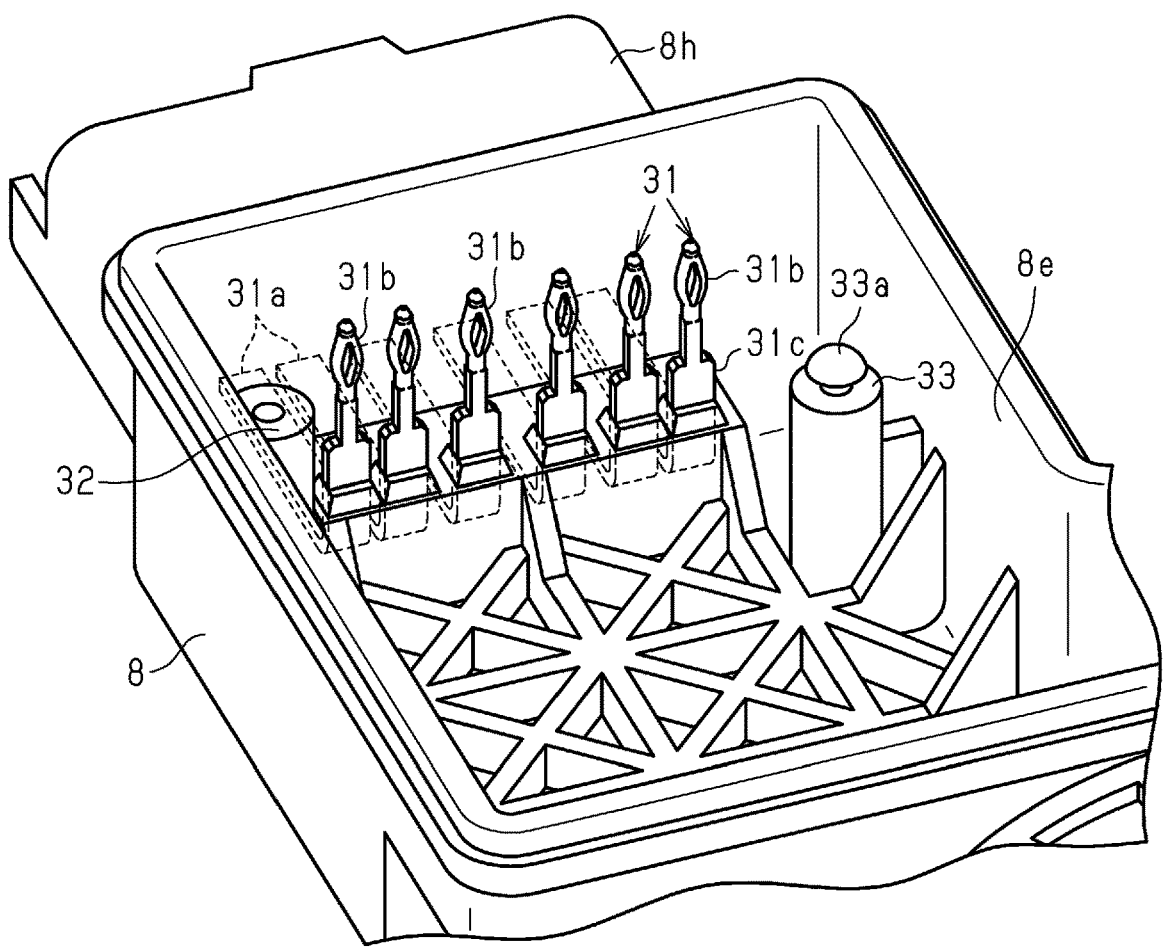
FIG. 7 is a perspective view of the surroundings of a board receptacle of the embodiment.

As shown in FIG. 7, the connector terminals 31 are molded (insertion-molded) integrally with the gear housing 8, and each connector terminal 31 has an intermediate portion embedded in the gear housing 8 and a connector-side end 31a projected in the connector 8h. The connector terminal 31 has an end opposite to the connector-side end 31a, and the end projects from the bottom of the board receptacle 8e in the direction orthogonal to the motor flattened surface (direction in which the board receptacle 8e is open, that is, direction extending frontward from the plane of FIG. 1) and includes a press-fitted portion 31b at the distal side. The press-fitted portion 31b is configured to be press-fitted into the through hole 23b so that the press-fitted portion 31b is in contact with a conductor arranged on the wall surface of the through hole 23b and electrically connected to the conductor.

Figure 8:
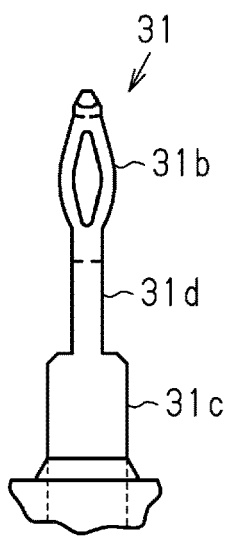
FIG. 8 is an illustrative view showing a connector terminal of the embodiment.

As shown in FIG. 8, the connector terminal 31 includes a portion insert-molded in the gear housing 8 and a portion projecting out of the gear housing 8. The portion projecting out of the gear housing 8 has a basal end including a wide part 31c that is wider than the press-fitted portion 31b. The connector terminal 31 further includes a flexible narrow part 31d arranged between the gear housing 8 and the press-fitted portions 31b serving as a flexible part. The narrow part 31d of the present embodiment is narrower than the press-fitted portion 31b and extends in the direction orthogonal to the motor flattened surface (direction in which the board receptacle 8e is open, or upper direction in FIG. 8) between the wide part 31c and the press-fitted portion 31b. The dimension of the wide part 31c in the direction orthogonal to the motor flattened surface is set to be substantially equal to the dimension of the narrow part 31d in the direction orthogonal to the motor flattened surface.

When the board receptacle 8e accommodates the circuit board 23 (in direction orthogonal to flattened direction), the press-fitted portions 31b are press-fitted into the through holes 23b. As a result, the connector terminals 31 of the connector 8h are directly and electrically connected to the circuit board 23.

As shown in FIGS. 1 and 7, in the present embodiment, the gear housing 8 includes adjacent contact portions 32 and contact fixing portions 33, each of which serves as a contact portion projecting from the bottom of the board receptacle 8e in the direction orthogonal to the motor flattened surface (direction in which the board receptacle 8e is open, that is, direction extending frontward from the plane of FIG. 1) to contact (the lower surface of) the circuit board 23 accommodated in the board receptacle 8e.

As shown in FIG. 1, each adjacent contact portion 32 is tubular and is arranged at a position contacting a portion of the circuit board 23 adjacent to the through holes 23a and 23b. More specifically, the present embodiment includes two adjacent contact portions 32, one of which is arranged substantially in a line with the press-fitted portions 15b of the terminals 15 and the other of which is arranged substantially in a line with the press-fitted portions 31b of the connector terminals 31 as viewed in the direction orthogonal to the motor flattened surface.

The contact fixing portions 33 cooperate with the two adjacent contact portions 32 to be arranged at positions contacting four corners of the circuit board 23 (its lower surface).

Figure 10:
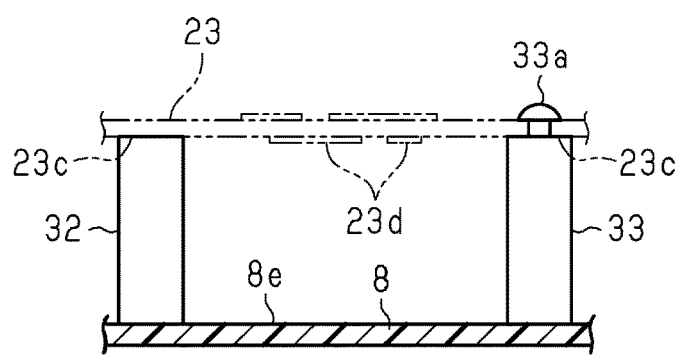
FIG. 10 is an illustrative view showing an adjacent contact portion and a contact fixing portion of the embodiment.

As shown in FIGS. 7 and 10, each contact fixing portion 33 is cylindrical and has a distal end contacting the circuit board 23 and a swage part 33a extending from a portion (center) of the distal end. The swage part 33a is inserted through and swaged to the circuit board 23. Before being inserted through the circuit board 23, the swage part 33a has the form of a cylinder having a constant small diameter. FIGS. 7 and 10 show a swaged (crushed) state after the insertion through the circuit board 23.

Figure 9A:
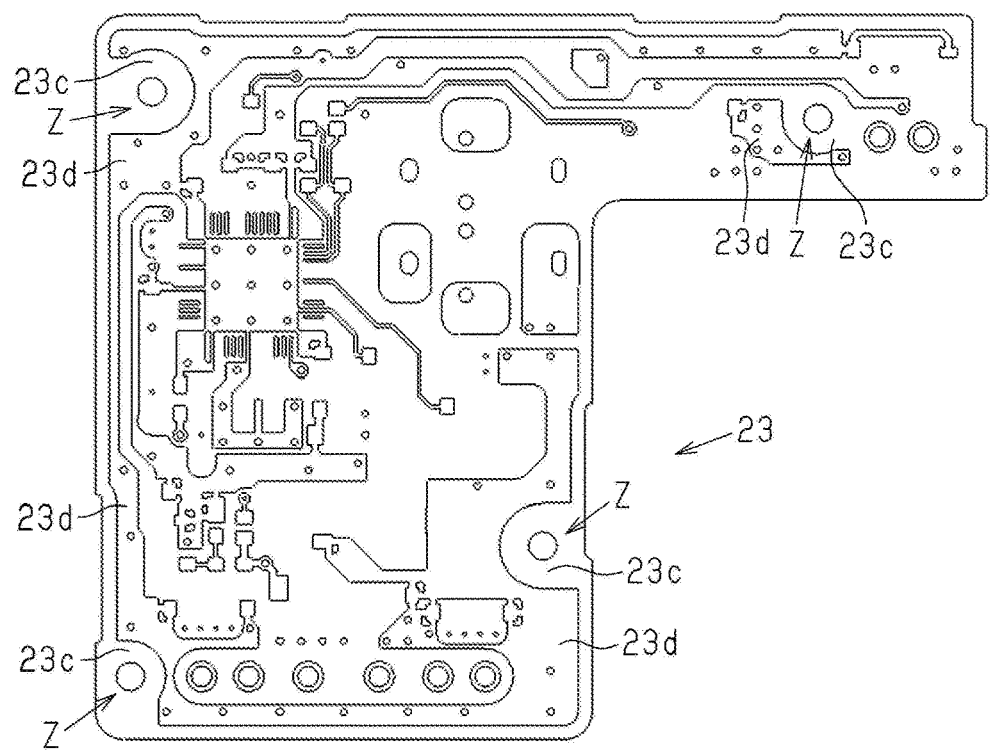
FIGS. 9A and 9B are illustrative views showing opposite surfaces of the circuit board of the embodiment.
Figure 9B:
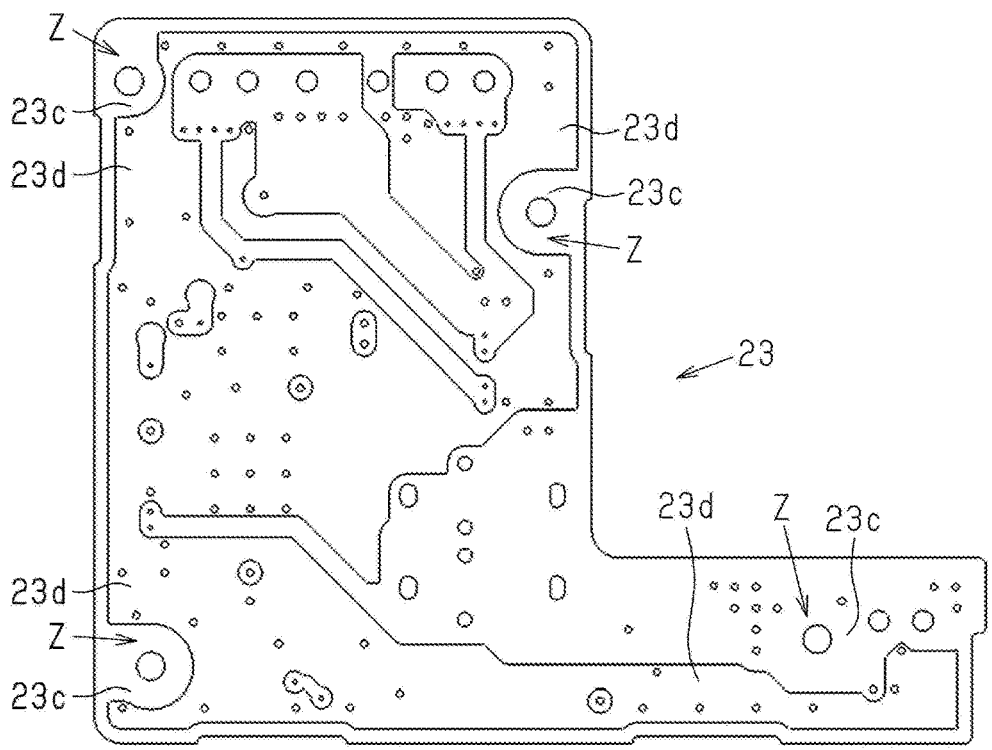

As shown in FIG. 10, each of the contact portions including the adjacent contact portions 32 and the contact fixing portions 33 has a projection dimension that is set to contact a conductive-pattern-free portion 23c of the circuit board 23. The surface of the circuit board 23 includes a conductive-pattern portion 23d where a conductive pattern is arranged and the conductive-pattern-free portion 23c where a conductive pattern is not arranged. As shown in FIGS. 9A and 9B, the conductive-pattern portion 23d is arranged almost entirely on the two surfaces of the circuit board 23. However, the conductive pattern avoids a portion Z of each surface that contacts the contact portions defining the conductive-pattern-free portion 23c. As shown in FIG. 10, the adjacent contact portion 32 and the contact fixing portion 33 are set to have the same height from the board receptacle 8e so that both the adjacent contact portion 32 and the contact fixing portion 33 are in contact with the conductive-pattern-free portion 23c. FIGS. 9A and 9B show the circuit board 23 on which various elements are not yet mounted.

When the board receptacle 8e accommodates the circuit board 23, the circuit board 23 contacts the adjacent contact portions 32 and the contact fixing portions 33 at a position where the press-fitted portions 15b and 31b are press-fitted into the through holes 23a and 23b. This determines the height of the circuit board 23 in the board receptacle 8e. The swage parts 33a are inserted through the circuit board 23 and swaged to fix the circuit board 23.

The operation of the motor 1 having the above configuration will now be described.

When power is supplied from an external power supply to the motor 1 via the connector 8h, the power is supplied through the circuit board 23, the terminals 15, the choke coils 14, and the brushes 13 to the commutator 12 (further, coil of the rotor 2). As a result, the rotor 2 (rotation shaft 3) is rotationally driven so that the window glass is driven to open and close. When the Hall IC 25 detects the magnetic field of the sensor magnet 18, which rotates integrally with the rotation shaft 3, the anti-entrapment controller of the circuit board 23 detects rotation speed of the rotation shaft 3. For example, when an entrapment of an object by the window glass is determined, the supply of power to the motor 1 is stopped or power is supplied to the motor 1 to reversely drive the window glass.

The advantages of the embodiment will now be described below.

(1) The terminals 15 of the brush holder 11 are directly and electrically connected to the circuit board 23. Thus, the number of components is reduced as compared to a case in which the terminals 15 and the circuit board 23 are connected by another conductive member.

(2) The circuit board 23 includes the through holes 23a, and the terminals 15 (press-fitted portions 15b) are inserted through the through holes 23a to establish the electrical connection. Thus, the circuit board 23 and the terminals 15 are electrically connected in a simple, stable manner, for example, as compared to a case in which the terminals 15 are in press contact with the circuit board 23 to be electrically connected to the circuit board 23.

(3) The distal side of each terminal 15 includes the press-fitted portion 15b, which is press-fitted into the through hole 23a to be in press contact with the conductor arranged on the wall surface of the through hole 23a and electrically connected to the conductor. The circuit board 23 and the terminals 15 are electrically connected more easily than, for example, a structure that does not include the press-fitted portion 15*b* and uses soldering. Additionally, there is no need for space for soldering, and downsizing may be achieved. More specifically, in press-fitting, the temperature is not increased as in soldering, and the resin gear housing 8 will not melt. Thus, the gear housing 8 may be downsized by arranging the gear housing 8 closer to a press-fitted portion.

(4) The connector terminals 31 of the connector 8*h* are directly and electrically connected to the circuit board 23. Thus, the number of components is reduced as compared to a case in which the connector terminals 31 and the circuit board 23 are connected by another conductive member.

(5) The circuit board 23 includes the through holes 23*b*, and the connector terminals 31 (press-fitted portions 31*b*) are inserted through the through holes 23*b* to establish the electrical connection. Thus, the circuit board 23 and the connector terminals 31 are electrically connected in a simple, stable manner, for example, as compared to a case in which the connector terminals 31 are in press contact with the circuit board 23 to be electrically connected to the circuit board 23.

(6) The distal side of each connector terminal 31 includes the press-fitted portion 31*b*, which is press-fitted into the through hole 23*b* to be in press contact with the conductor arranged on the wall surface of the through hole 23*b* and electrically connected to the conductor. The circuit board 23 and the connector terminals 31 are electrically connected more easily than, for example, a structure that does not include the press-fitted portion 31*b* and uses soldering. Additionally, there is no need for space for soldering, and downsizing may be achieved. More specifically, in press-fitting, the temperature is not increased as in soldering, and the resin gear housing 8 will not melt. Thus, the gear housing 8 may be downsized by arranging the gear housing 8 closer to a press-fitted portion.

(7) The connector terminals 31 are molded (insertion-molded) integrally with the gear housing 8. The portion projecting out of the gear housing 8 has a basal end including the wide part 31*c* that is wider than the press-fitted portion 31*b*. This eliminates the need for a complex mold used to mold the connector terminals 31 integrally with the gear housing 8. More specifically, if the basal end of the portion of the connector terminal 31 projecting out of the gear housing 8 is narrower than the press-fitted portion 31*b*, it is difficult to simply remove the mold toward the distal side where the press-fitted portion 31*b* is formed and thus needs a complex mold. According to the embodiment, such a complex mold is not needed. Additionally, the connector terminal 31 includes the flexible narrow part 31*d* (flexible part) between the gear housing 8 and the press-fitted portion 31*b*. This limits application of high stress to the circuit board 23, which includes the through holes 23*b*, when or after the press-fitted portions 31*b* are press-fitted into the through holes 23*b*. Thus, for example, breakage of the circuit board 23 is limited.

(8) The flexible part is the narrow part 31*d* that is arranged between the wide part 31*c* and the press-fitted portion 31*b* and is narrower than the press-fitted portion 31*b*. The simple configuration limits application of high stress to the circuit board 23. Thus, for example, breakage of the circuit board 23 is limited.

(9) The gear housing 8 includes the adjacent contact portions 32 and the contact fixing portions 33, which serve as the contact portions projecting in the direction orthogonal to the motor flattened surface to contact the circuit board 23. The adjacent contact portions 32 are arranged at positions contacting portions of the circuit board 23 adjacent to the through holes 23*a* and 23*b*. This stabilizes the height of the through holes 23*a* and 23*b* in relation to the gear housing 8 (ultimately, press-fitted portions 15*b* and 31*b*) and allows the press-fitted portions 15*b* and 31*b* to be stably press-fitted into the through holes 23*a* and 23*b*.

(10) The swage part 33*a*, which extends from a portion of the distal end of the contact fixing portion 33, is inserted through and swaged to the circuit board 23. Thus, the circuit board 23 is fixed to the gear housing 8 with the swage parts 33*a* of the contact fixing portions 33. Each of the contact portions including the adjacent contact portions 32 and the contact fixing portions 33 has a projection dimension that is set to contact the conductive-pattern-free portion 23*c* of the circuit board 23. Thus, the contact portions stably contact and support the circuit board 23 at the same height as compared to, for example, contact portions that are set so as to contact the conductive-pattern-free portion 23*c* and the conductive-pattern portion 23*d*. More specifically, if contact portions are set to contact the conductive-pattern-free portion 23*c* and the conductive-pattern portion 23*d*, the contact portions need to be set to have different heights in accordance with the thickness of the conductive pattern, and it is difficult to stably contact and support the circuit board 23 at the same height. However, this is simply done. Additionally, the contact portions are not in contact with the conductive-pattern portion 23*d*. This avoids application of force to the conductive pattern and limits, for example, displacement or separation of the conductive pattern.

(11) As viewed in the axial direction of the rotation shaft 3, the Hall IC 25 of the circuit board 23 is arranged outside the range A1 of the rotation shaft 3 in the direction in which the motor flattened surface extends (also, outside the range A2 of the sensor magnet 18 in the direction in which the motor flattened surface extends), and the terminals 15 (the press-fitted portions 15*b*) are arranged in the range of the brush holder receptacle 8*b* of the gear housing 8. This allows the terminals 15 to be directly and electrically connected to the circuit board 23 while avoiding an increase in size in the direction orthogonal to the motor flattened surface. More specifically, the terminals 15 need to be arranged in the range of the brush holder receptacle 8*b* as viewed in the axis direction of the rotation shaft 3 to accomplish the coupling of the brush holder 11 to the gear housing 8 (brush holder receptacle 8*b*). Further, for example, when the Hall IC 25 is arranged in the range A1 of the rotation shaft 3 in the direction in which the motor flattened surface extends (the range A2 of the sensor magnet 18 in the direction in which the motor flattened surface extends) as viewed in the axial direction of the rotation shaft 3, the brush holder receptacle 8*b* may need to be enlarged in the direction orthogonal to the flattened direction so that the circuit board 23 and the terminals 15 (press-fitted portions 15*b*) are arranged in the range of the brush holder receptacle 8*b*. Such a need is eliminated. More specifically, in the present embodiment, the Hall IC 25, the circuit board 23, and the terminals 15 (press-fitted portions 15*b*) are arranged in the range B of the sensor magnet 18 in the direction orthogonal to the motor flattened surface as viewed in the axial direction of the rotation shaft 3. This allows the terminals 15 to be directly and electrically connected to the circuit board 23 while avoiding an increase in size in the direction orthogonal to the motor flattened surface and obtaining a slim configuration. As viewed in the axial direction of the rotation shaft 3, the Hall IC 25 of the circuit board 23 is arranged at a side opposite to the position of the brushes 13 in the gear housing 8 (brush holder receptacle 8*b*) outside the range A1 of the rotation shaft 3 in the direction in which the motor flattened surface extends (or outside the range A2 of the sensor magnet 18 in the direction in which the motor flattened surface extends). This limits brush dust reaching the Hall IC 25 and reduces the effect of brush dust. The Hall IC 25 of the circuit board 23 may be arranged at a side opposite to the brushes 13 outside the range A1 of the rotation shaft 3 in the direction in which the motor flattened surface extends but in the range A2 of the sensor magnet 18 in the direction in which the motor flattened surface extends. However, the arrangement outside the range A2 of the sensor magnet 18 in the direction in which the motor flattened surface extends further limits the reaching of brush dust.

(12) As viewed in the direction orthogonal to the motor flattened surface, the gear housing 8 includes the wall surfaces 8k, which restrict movement of the terminals 15 (press-fitted portions 15b) in the direction orthogonal to the axis of the rotation shaft 3. This prevents, for example, large misalignment of the terminals 15 with the circuit board 23 in the direction orthogonal to the axis of the rotation shaft 3. Thus, a situation is avoided in which, for example, when the board receptacle 8e accommodates the circuit board 23, the press-fitted portions 15b of the terminals 15 are not inserted through (press-fitted into) the through holes 23a.

(13) The distance X1 between the two wall surfaces 8k, to which the terminal 15 is fit, is set to be greater than the dimension X2 of the terminal 15 in the direction of the distance X1. This allows for slight movement of the terminal 15 (press-fitted portion 15b) in the direction orthogonal to the axis of the rotation shaft 3 as viewed in the direction orthogonal to the motor flattened surface. Thus, for example, when the press-fitted portion 15b is inserted through the through hole 23a as the circuit board 23 is accommodated in the board receptacle 8e, the terminal 15 (press-fitted portion 15b) is allowed to slightly move between the wall surfaces 8k in accordance with the position of the through hole 23a. This limits local application of high stress to the terminal 15.

(14) The terminal 15 includes the slim portion 15c arranged at the basal side (intermediate portion of axial extension 15a) of the portion restricted by the wall surfaces 8k. This limits continuous application of high stress to the basal side of the restricted portion, for example, in a state restricted by the wall surfaces 8k. More specifically, for example, in the state restricted by the wall surfaces 8k, when the brush holder 11 is misaligned with the gear housing 8 or the terminals 15 are misaligned with the brush holder 11, stress may be continuously applied to the terminal 15 at the basal side of the portion restricted by the wall surfaces 8k. Such stress is reduced. Additionally, when the terminal 15 is guided by the two guide surfaces 8m to a position between the wall surfaces 8k during the coupling, the slim portion 15c readily bends. This reduces situations in which the terminal 15 (end of the axial extension 15a) scrapes the guide surfaces 8m and the wall surfaces 8k.

(15) The gear housing 8 includes the seat surface 8n, which restricts movement of the terminals 15 (press-fitted portions 15b) in a direction toward the bottom of the board receptacle 8e. This prevents, for example, misalignment of the terminals 15 with the circuit board 23 in the direction orthogonal to the motor flattened surface. More specifically, in the present embodiment, when the circuit board 23 is accommodated in the board receptacle 8e and the press-fitted portions 15b are press-fitted into the through holes 23a, the terminals 15 (press-fitted portions 15b) are supported (received) by the seat surface 8n. Thus, the press-fitted portions 15b are appropriately press-fitted into the through holes 23a.

The embodiment may be changed as follows.

The narrow part 31d of the embodiment used as the flexible part may be changed to a flexible part having a different configuration as long as the configuration allows the press-fitted portions 31b to be bent more easily than basal part of the portion projecting out of the gear housing 8.

Figure 11:
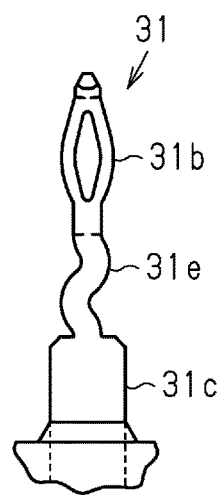
FIG. 11 is an illustrative view showing another example of a connector terminal.

For example, as shown in FIG. 11, a flexible part may be configured to be an S-shaped narrow part 31e that is arranged between the wide part 31c and the press-fitted portion 31b and is narrower than the press-fitted portion 31b.

Figure 12A:
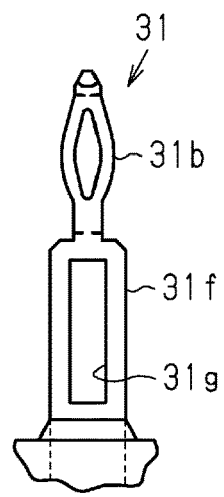
FIGS. 12A and 12B are illustrative views showing another example of a connector terminal.
Figure 12B:
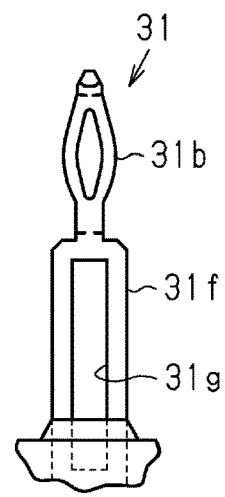

As shown in FIGS. 12A and 12B, a flexible part may be configured to be a wide part 31f that is wider than the press-fitted portion 31b and includes a through portion 31g. FIG. 12A shows an example in which the entire through portion 31g is arranged outside the gear housing 8. This example eliminates the need for a mold having a complex configuration used to mold the connector terminals 31 integrally with the gear housing 8. FIG. 12B shows an example in which the through portion 31g is partially arranged (embedded) in the gear housing 8.

The connector terminal 31 may have a structure that does not include a flexible part.

In the embodiment, the groove 8j includes the two opposing wall surfaces 8k, to which the terminal 15 is fitted. The distance X1 between the wall surfaces 8k is set to be greater than the dimension X2 of the terminal 15 in the direction of the distance X1. However, the groove 8j may have a different shape.

Figure 13:
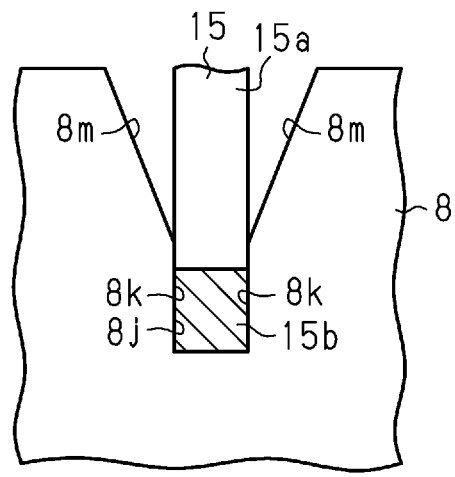
FIG. 13 is a plan view showing another example of a groove and a terminal.

For example, as shown in FIG. 13, the distance between the wall surfaces 8k may be set to the same as the dimension of the terminals 15 in the direction of the distance.

Figure 14:
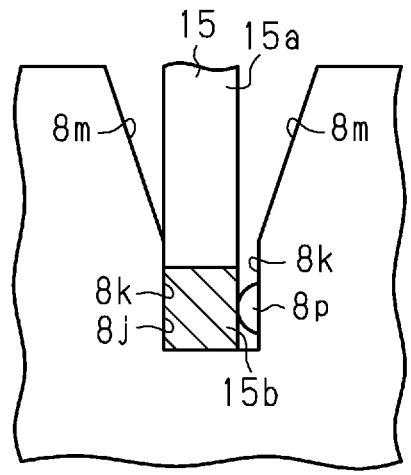
FIG. 14 is a plan view showing another example of a groove and a terminal.

For example, as shown in FIG. 14, one of the wall surfaces 8k may include a projection 8p that spherically projects.

For example, the gear housing 8 may have a structure that does not include the wall surfaces 8k or may have a structure that does not include the seat surface 8n.

In the embodiment, the circuit board 23 includes the through holes 23a, and the terminals 15 (press-fitted portions 15b) are inserted through the through holes 23a to establish the electrical connection. The configuration may be changed to another configuration that directly and electrically connects the terminals 15 and the circuit board 23.

Figure 15:
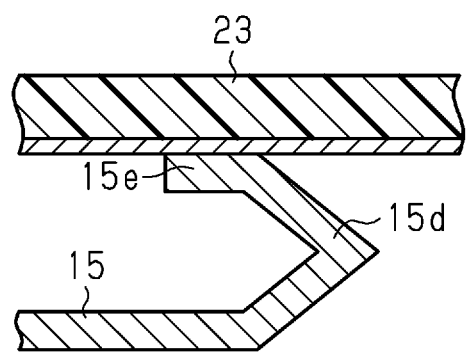
FIG. 15 is a cross-sectional view showing another example of a circuit board and a terminal.

For example, as shown in FIG. 15, the terminal 15 includes an elastic member 15d and a distal contact portion 15e, and the elastic member 15d acts so that the distal contact portion 15e is in press contact with the circuit board 23 and is directly and electrically connected to the circuit board 23.

In the embodiment, the terminal 15 includes the press-fitted portion 15b, and the press-fitted portion 15b is press-fitted into the through hole 23a to establish electrical connection. Instead, the press-fitted portion 15b may be omitted, the terminal 15 may be inserted through the through hole 23a and soldered to establish electrical connection.

The connector terminal 31 of the embodiment may also be changed in the same manner as the terminal 15. The connector terminal 31 may be connected to the circuit board 23 via another conductive member.

In the embodiment, the gear housing 8 includes the adjacent contact portions 32 and the contact fixing portions 33, which serve as the contact portions projecting in the direction orthogonal to the motor flattened surface to contact the circuit board 23. The configurations of the adjacent contact portions 32 and the contact fixing portions 33 may be changed. For example, at least one of the group of the adjacent contact portions 32 and the group of the contact fixing portions 33 may be set to contact the conductive-pattern portion 23d of the circuit board 23. The adjacent contact portions 32 do not have to be tubular and may be, for example, cylindrical or polygonal-rod-shaped. The contact fixing portions 33 do not have to be cylindrical and may be, for example, polygonal-rod-shaped.

In the embodiment, the terminal 15 includes the slim portion 15c. However, the slim portion 15c may be omitted from the configuration.

The invention claimed is:

1. A motor comprising:
a motor body that rotationally drives a rotation shaft and includes a motor case;
a speed reduction unit that reduces speed of rotation of the rotation shaft and includes a gear housing that has a board receptacle that is open in a direction orthogonal to a motor flattened surface;
a brush holder held by the motor case and the gear housing; and
a circuit board in the board receptacle that includes a conductive-pattern-free portion, wherein:
the brush holder includes a plurality of terminals;
a distal end of each of the plurality of terminals includes a terminal press-fitted portion that extends in the direction orthogonal to the motor flattened surface and is directly and electrically connected to the circuit board;
the terminal press-fitted portions are in a terminal straight line that is orthogonal to an axial direction of the rotation shaft;
the gear housing includes a connector that is configured to receive and engage an external connector;
the connector includes a plurality of connector terminals that are molded integrally with the gear housing;
a distal end of each of the plurality of connector terminals includes a connector terminal press-fitted portion that extends in the direction orthogonal to the motor flattened surface in a connector terminal extension direction and is directly and electrically connected to the circuit board;
the connector terminal press-fitted portions are in a connector terminal straight line that is orthogonal to the axial direction of the rotation shaft;
the gear housing includes a plurality of contact portions projecting in the direction orthogonal to the motor flattened surface to contact the circuit board;
a first tip of at least one of the plurality of contact portions contacts the conductive-pattern-free portion of the circuit board in the direction orthogonal to the motor flattened surface and is substantially in the terminal straight line; and
a second tip of at least another of the plurality of contact portions contacts the conductive-pattern-free portion of the circuit board in the direction orthogonal to the motor flattened surface and substantially in the connector terminal straight line.

2. The motor according to claim 1, wherein
the circuit board includes through holes, and
the terminal press-fitted portions are inserted through the through holes to directly and electrically connect the plurality of terminals to the circuit board.

3. The motor according to claim 2, wherein the terminal press-fitted portions are in press contact with conductors on wall surfaces of the through holes and electrically connected to the conductors.

4. The motor according to claim 3, wherein
the at least one of the plurality of contact portions contacts a portion of the circuit board that is adjacent to one of the through holes.

5. The motor according to claim 4, wherein
each of the plurality of contact portions includes a contact fixing portion,
the contact fixing portion has a distal end and includes a swage part extending from the distal end, and
the swage part is configured to be inserted through the circuit board and swaged to the circuit board.

6. The motor according to claim 2, wherein
the gear housing includes first restriction portions that restrict movement of the each of the plurality of terminals in a direction orthogonal to an axis of the rotation shaft as viewed in the direction orthogonal to the motor flattened surface,
each of the first restriction portions includes two wall surfaces to which one of the plurality of terminals is fitted, and
a distance between the two wall surfaces is greater than a dimension of the one of the plurality of terminals in a direction of the distance.

7. The motor according to claim 6, wherein the each of the plurality of terminals includes a slim part arranged at a basal side of a portion restricted by the each of the first restriction portions.

8. The motor according to claim 2, wherein
the at least one of the plurality of contact portions contacts a portion of the circuit board that is adjacent to one of the through holes.

9. The motor according to claim 1, wherein
the circuit board includes through holes, and
the connector terminal press-fitted portions are inserted through the through holes to directly and electrically connect the connector to the circuit board.

10. The motor according to claim 9, wherein the connector terminal press-fitted portions are in press contact with conductors on wall surfaces of the through holes and electrically connected to the conductors.

11. The motor according to claim 10, wherein
the each of the connector terminals includes:
a portion projecting out of the gear housing and having a basal end, the basal end including a wide part that is wider than the connector terminal press-fitted portion, and
a flexible part that is flexible and arranged between the gear housing and the connector terminal press-fitted portion.

12. The motor according to claim 11, wherein
the flexible part is a narrow part that is arranged between the wide part and the connector terminal press-fitted portion and is narrower than the connector terminal press-fitted portion.

13. The motor according to claim 1, wherein
the gear housing includes a brush holder receptacle that accommodates a portion of the brush holder,
the circuit board includes a magnetic sensor that detects a magnetic field of a sensor magnet that rotates integrally with the rotation shaft, and
as viewed in the axial direction of the rotation shaft, the magnetic sensor is arranged outside a range of the rotation shaft in a direction in which the motor flattened surface extends, and the plurality of terminals is arranged in a range of the brush holder receptacle.

14. The motor according to claim 13, wherein, as viewed in the axial direction of the rotation shaft, the magnetic sensor is arranged outside a range of the sensor magnet in the direction in which the motor flattened surface extends.

15. The motor according to claim 1, wherein
the gear housing includes a brush holder receptacle that accommodates a portion of the brush holder,
the circuit board includes a magnetic sensor that detects a magnetic field of a sensor magnet that rotates integrally with the rotation shaft, and
as viewed in the axial direction of the rotation shaft, the magnetic sensor is arranged in a range of the sensor magnet in the direction orthogonal to the motor flattened surface, and the terminal plurality of terminals is arranged in a range of the brush holder receptacle.

16. The motor according to claim 1, wherein the gear housing includes first restriction portions that restrict movement of the each of the plurality of terminals in a direction orthogonal to an axis of the rotation shaft as viewed in the direction orthogonal to the motor flattened surface.

17. The motor according to claim 16, wherein the each of the plurality of terminals includes a slim part arranged at a basal side of a portion restricted by each of the first restriction portions.

18. The motor according to claim 1, wherein the gear housing includes a second restriction portion that restricts movement of the plurality of terminals in a direction toward a bottom of the board receptacle.

19. The motor according to claim 1, wherein:
the each of the plurality of connector terminals includes a flexible narrow part arranged at a distal side of the each of the plurality of connector terminals; and
the narrow part is narrower than the connector terminal press-fitted portion.

20. A motor comprising:
a motor body that rotationally drives a rotation shaft and includes a motor case;
a speed reduction unit that reduces speed of rotation of the rotation shaft and includes a gear housing that has a board receptacle that is open in a direction orthogonal to a motor flattened surface;
a brush holder held by the motor case and the gear housing; and
a circuit board in the board receptacle, wherein:
the brush holder includes a terminal that includes an axial extension that extends from the brush holder in an axial direction of the rotation shaft and a press-fitted portion that is bent from the axial extension and extends in the direction orthogonal to the motor flattened surface;
the gear housing includes a groove into which the terminal is fitted;
the groove includes (1) two side wall surfaces that restrict movement of the terminal in a direction orthogonal to an axis of the rotation shaft as viewed in the direction orthogonal to the motor flattened surface and (2) a bottom surface that restricts movement of the terminal in a direction toward a bottom of the board receptacle;
the two side wall surfaces are formed so that a distance between the two side wall surfaces gradually increases toward the terminal; and
the terminal is in the groove and directly and electrically connected to the circuit board.

* * * * *